United States Patent [19]
Anderson

[11] 3,811,723
[45] May 21, 1974

[54] CAMPING TRAILER
[76] Inventor: William H. Anderson, 236 Pearl St. Apt. 11, Oregon City, Oreg. 97045
[22] Filed: Sept. 25, 1972
[21] Appl. No.: 291,883

[52] U.S. Cl. ............................ 296/26, 296/23 R
[51] Int. Cl. .................................. B60p 3/34
[58] Field of Search .................. 296/23 R, 26

[56] References Cited
UNITED STATES PATENTS
3,381,421  5/1968  Sicklesteel ........................ 296/26

Primary Examiner—Philip Goodman

[57] ABSTRACT

An expansible and retractable housing adapted for concealed securement, when collapsed within the rearward end of a camping trailer or similar vehicle, and when extended and expanded to provide an additional bedroom or the like. The housing comprises foldable side walls made of panels hingedly interconnected to each other and to the the sides of an opening in a wall of the trailer or to a frame secured within said opening. A top wall for the housing is hingedly attached along the top edge of said opening in the trailer wall and when swung outwardly and upwardly serves as a roof for said housing when the housing is fully extended from its concealment within the opening, or within the confines thereof. The housing includes a bottom wall or platform adapted to be swung from a vertical position on the interior of the camper then downwardly and outward to provide a bottom wall or floor for the extended housing.

1 Claim, 7 Drawing Figures

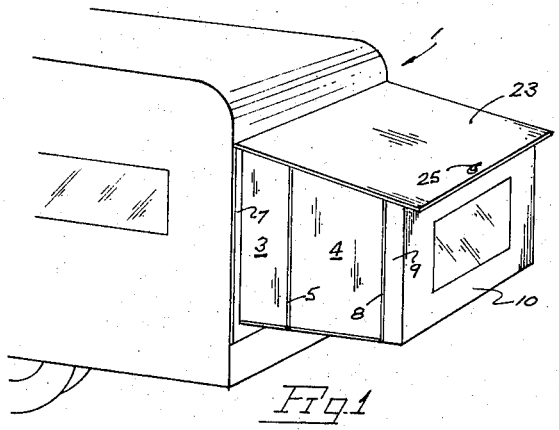
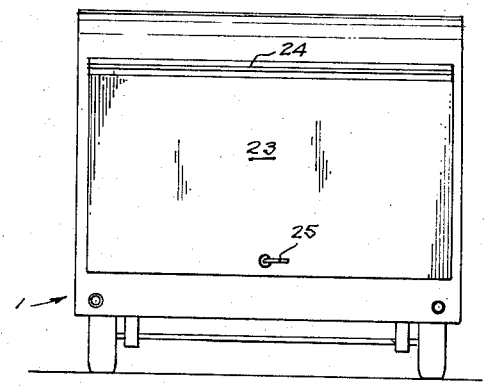
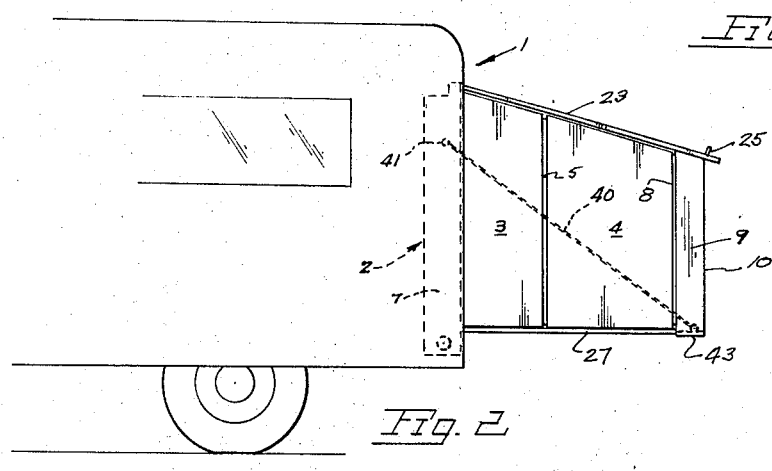
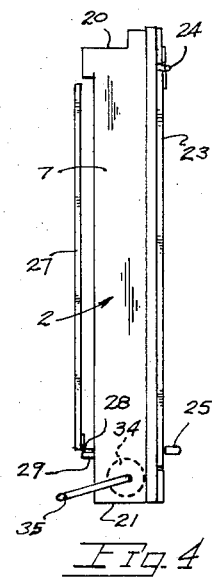
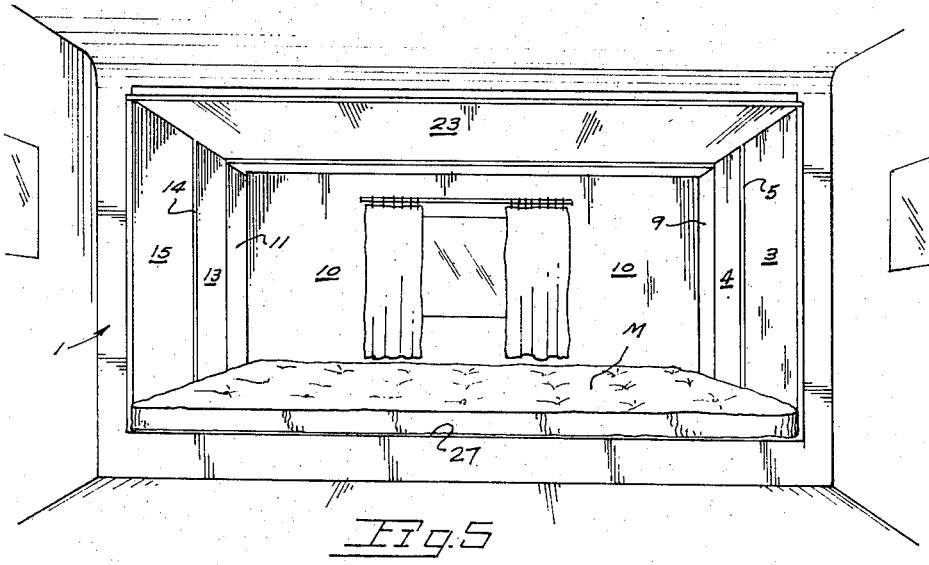

CAMPING TRAILER

This invention relates to improvements in camping trailers and more particularly to a housing of more simplified, efficient and inexpensive construction than that of the type shown and described in my U.S. Pat. No. 3,177,030.

The principal objects of the invention are:

To provide an auxiliary housing containing the usual bedroom furnishings such as bedding and related items.

To provide an auxiliary housing of the character described whose side walls are extensible from a collapsed and concealed position within a wall of the camper trailer into a room or housing whose internal floor space is substantially equal to, or greater than, that of a mattress and wherein the walls and the roof are of sufficient height to provide adequate space for a user's usual movements in changing into bedclothing or for redressing in outdoor wearing apparel.

The foregoing and other objects and advantages which will become subsequently apparent, reside in the details of construction and operation as more fully hereinafter described and claimed, reference being had to the accompanying drawing forming a part hereof and in which:

FIG. 1 is a fragmentary perspective view of the rearward end of a camper trailer embodying the present invention which is shown in an extended position.

FIG. 2 is a side elevational view of FIG. 1.

FIG. 3 is a rear elevational view of FIG. 1 with the invention collapsed and concealed within the body of the camper trailer.

FIG. 4 is a side elevational view, on an enlarged scale, of the invention collapsed and concealed within a unitary housing adapted for securement to the open rearward end of a camping trailer.

FIG. 5 is a rear elevational view of the auxiliary housing in an extended position ready for use as a bedroom with a self-contained mattress resting upon the bottom wall of the housing and adapted for tilt-up concealment within the structure of the housing when it is collapsed and concealed within the trailer body.

Figure 6:
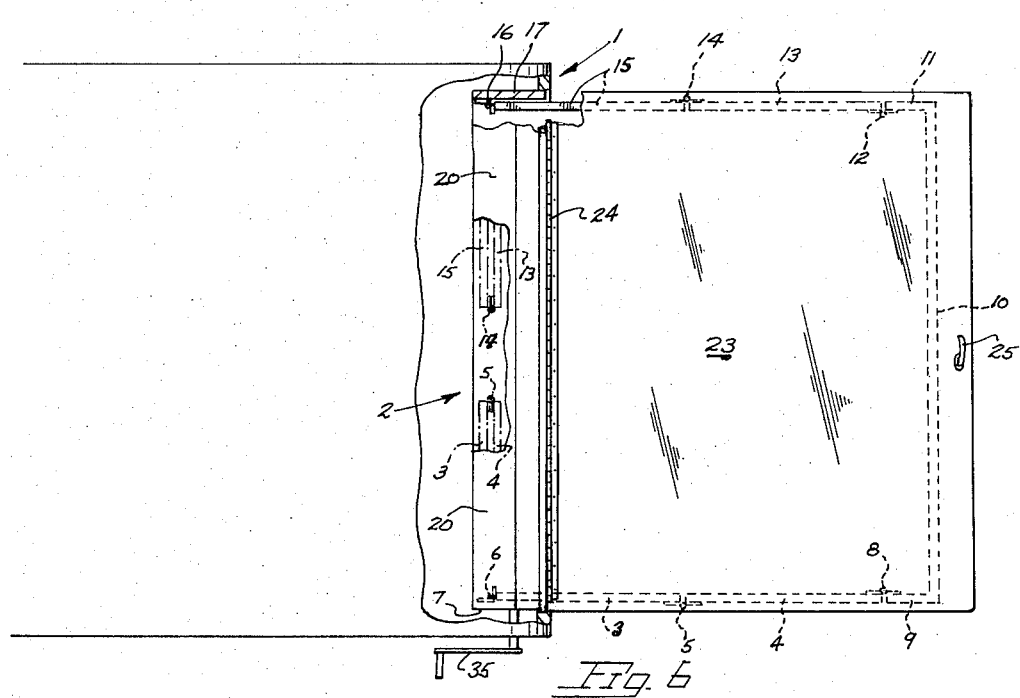
FIG. 6 is a top plan view of FIG. 1, on an enlarged scale, showing in full lines, the invention in a fully extended position and by dotted lines in various positions of collapse.

With continuing reference to the drawings wherein like reference numerals designate like parts, numeral 1 indicates generally the rear wall of a camper trailer or body of a similar vehicle.

This rear wall has an opening therethrough for securement therewithin of a frame structure indicated generally at 2 in FIGS. 2 and 4.

The expansible and retractable housing of the invention as viewed in FIGS. 1 and 2 and rearwardly from the interior, as in FIG. 5, comprises left hand wall panels 3 and 4 hingedly interconnected as at 5. The forward edge of panel 3 is hingedly attached as at 6 (FIG. 6) to the left side member 7 of the frame structure 2.

The rearward edge of panel 3 is connected to the forward edge of panel 4 by a hinge 5. The opposite or rearward edge of panel 4 is hingedly attached as at 8 to a side 9 of a rear box-like structure comprising a rear wall 10 and a side wall 11 opposite the side wall 9.

Hingedly attached as at 12 (FIG. 6) to the side wall 11 is the rearward edge of a right hand panel 13 whose opposite edge is hingedly connected as at 14 to the rearward edge of a companion panel 15 whose opposite edge is hingedly connected as at 16 to the vertical side wall 17 of the frame 2.

Figure 7:
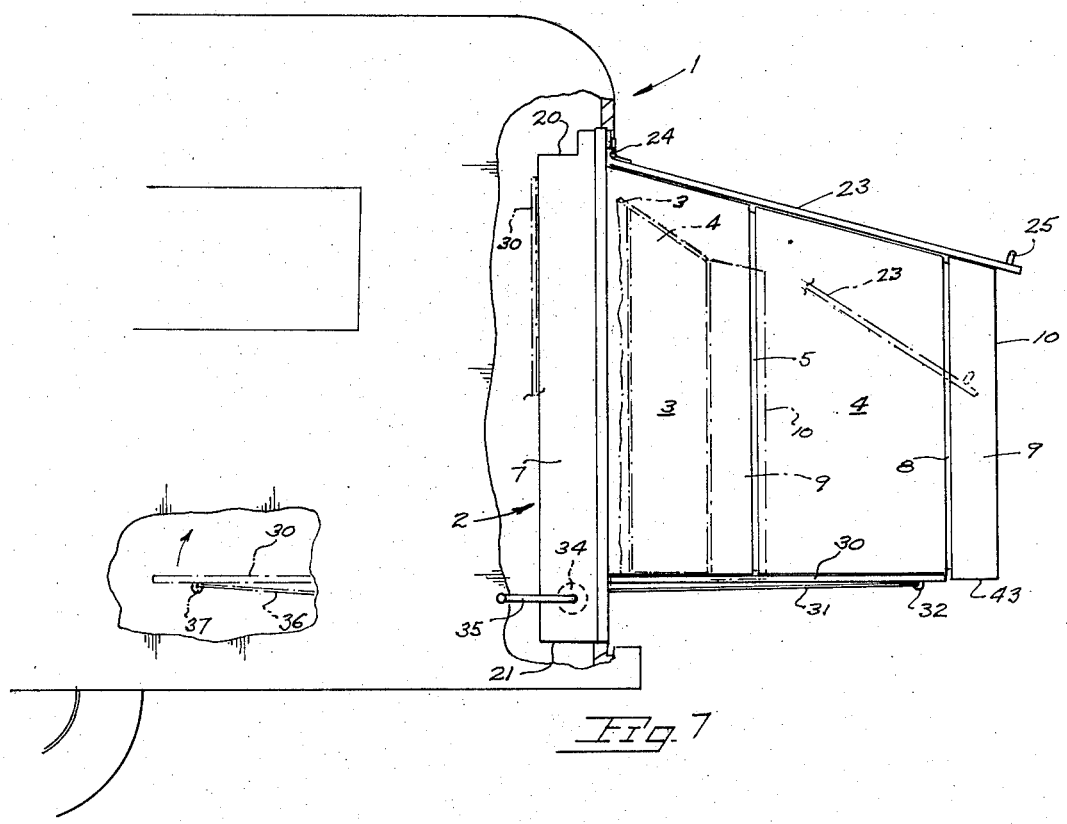
FIG. 7 is a side elevational view of FIG. 6.

The frame 2 as best illustrated in FIGS. 4, 6 and 7 comprises a top cross member 20 and a bottom cross member 21 all secured together as a complete unitary structure which may be permanently built into any wall, but preferably the rear wall, of the trailer body within an accommodating opening therethrough which opening also provides an entrance or access to the interior of the extended housing. A roof 23 is hingedly attached (FIG. 7) as at 24 to the rearward edge of the top cross member 20 of the frame 2. The rearward edge of the roof 23 is provided with any suitable type of latching means 25 for locking the roof in the closed position shown in the FIGS. 3 and 4.

A floor in the form of a panel 27 (FIG. 4) is hingedly attached as at 28 to a horizontal portion 29 fixedly secured within and across the bottom portion of the frame 2. Panel 27 when swung upwardly cooperates with the now vertically disposed roof 23 and the interior of the frame 2, in providing storage space for a mattress M (FIG. 5), when tilted upardly, and other bedding articles.

As a modified form of flooring arrangement such for example as illustrated in FIG. 7 the floor 30 is a single panel slidable rearwardly outward from the frame 2 to provide a support for the extended collapsible walls 3, 4, 13, 15 and roof 23. Here the floor 30 may be retracted from its extended position (FIG. 7) to the interior of the trailer body 1 by a pull cable 31 secured as at 32 to the underside of the floor and wound about a winding drum 34 provided with a crank handle 35. Similarly the floor 30 may be extended from the interior of the trailer body, as shown in broken lines, by a second pull cable 36 secured as at 37 to the floor 30 panel and also wound about the winding drum 34.

From the foregoing it will be apparent that I have provided an auxiliary room or housing mounted preferably on the rear wall of a camper trailer vehicle, readily extensible into a roof-covered housing of adequate space for sleeping accommodations and one which is capable of collapse from its extended position into compact form within a frame carried by the vehicle body with the contents of the room stored in a clean sanitary condition when not in use.

For setting up the auxiliary room for use, it is merely necessary to swing the roof 23 upwardly to enable the collapsible or foldable side walls and rear wall to be slid outwardly to their full extent upon a solid flooring which provides a support for the roof. The floor is also retractable to the interior of the trailer body and therein utilized as a closure for the frame in cooperation with the roof when lowered into a vertical position.

As best illustrated in FIG. 2, I provide a chain or cable 40 on each side of the extensible housing on the interior thereof. One end of each chain is secured as at 41 to the frame structure 2 and the opposite end of each cable is secured in any suitable manner to the bottom wall 43 of the rear box-like structure 9. Both chains maintain the flooring 27 in a fixedly supported position under all loads imposed upon it.

What I claim is:

1. An expansible and retractable housing, comprising parts assembled and mounted within a frame having side members and top and bottom cross members, said frame adapted for fixed securement within an opening in a wall of a vehicle body, said housing comprising a bottom wall, top wall, rear wall and vertically disposed collapsible side walls, said bottom wall of the housing supported upon said bottom cross member of said frame and thereby movable from the interior of said vehicle body to an outward extending position relative to the trailer body, at least one flexible tensile element attached at one of its ends to said frame and at its opposite end to said bottom wall of the housing, said bottom wall hingedly attached along its outer edge to said rear wall of said housing and thereby swingable upwardly against the front of said frame to provide one closure wall cooperating with said top wall when swung downwardly and with said rear wall to provide a compact storage compartment for contents of said housing when collapsed and retracted to the interior of said vehicle body, said collapsible side walls of the housing hingedly interconnected at their inner abutting edges and hingedly connected at their opposite edges respectively to said rear wall and to said side members of said frame.

* * * * *